United States Patent [19]

Malone

[11] Patent Number: 4,502,096

[45] Date of Patent: Feb. 26, 1985

[54] LOW-INDUCTANCE CAPACITOR

[75] Inventor: Edgar W. Malone, Goleta, Calif.

[73] Assignee: Reynolds Industries Inc., Los Angeles, Calif.

[21] Appl. No.: 521,986

[22] Filed: Aug. 11, 1983

[51] Int. Cl.³ .......................... H01G 1/13; H01G 7/00
[52] U.S. Cl. ..................................... 361/308; 29/25.42
[58] Field of Search ................ 361/306, 308; 29/25.42

[56] References Cited

U.S. PATENT DOCUMENTS

| | | | |
|---|---|---|---|
| 1,480,604 | 1/1924 | Dubilier | 361/308 |
| 1,721,152 | 7/1929 | Graham | 361/308 |
| 1,920,346 | 8/1933 | Blake et al. | 361/308 |
| 2,820,934 | 1/1958 | Mullikin | 361/308 |
| 2,969,488 | 1/1961 | Foster et al. | 361/308 |
| 3,398,340 | 8/1968 | Geoghegan | 361/308 |

Primary Examiner—Donald A. Griffin
Attorney, Agent, or Firm—Pretty, Schroeder, Brueggemann & Clark

[57] ABSTRACT

A low-inductance capacitor, and related method for manufacturing it, of a type that includes two foil strips and two dielectric strips interleaved together and wound into a spiral capacitor roll. The two foil strips are offset laterally with respect to each other and the roll is flattened such that its two sides are defined by oblong spiral projections of the foil strips. Two separate U-shaped clamps compressively grip the two oblong spiral projections, to form electrical terminals for the capacitor roll, each terminal in secure electrical contact with all of the successive windings of the corresponding foil strip. The capacitor roll is adapted for mounting on a foil strip transmission line, the combination providing an extremely low inductance.

14 Claims, 10 Drawing Figures

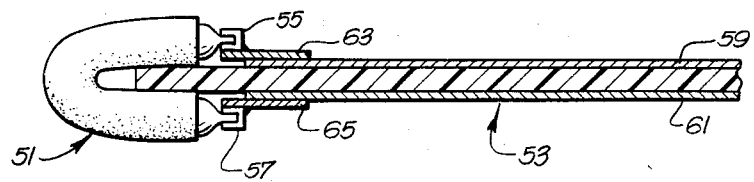
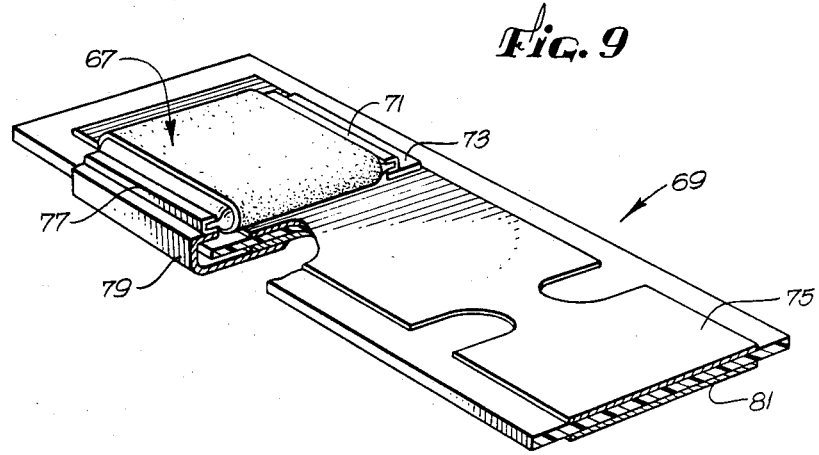
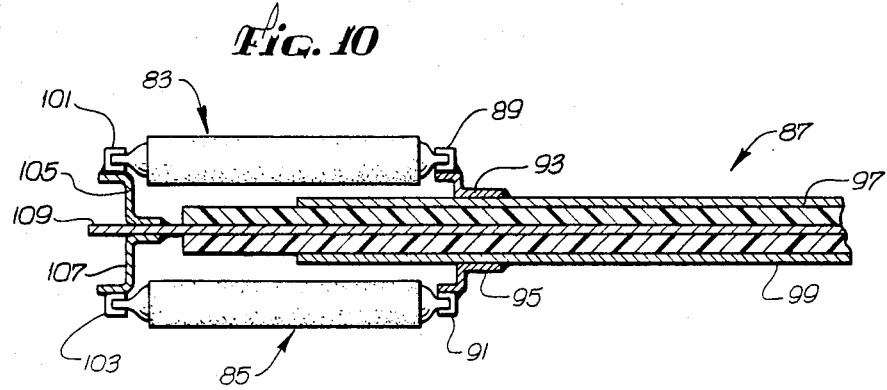

LOW-INDUCTANCE CAPACITOR

BACKGROUND OF THE INVENTION

This invention relates generally to capacitors, and, more particularly, to capacitors having an extremely low inductance.

Low-inductance capacitors are particularly useful in applications requiring rapid current discharges. An example of such an application is an exploding bridgewire or exploding foil initiator system, where an electrical charge stored on a capacitor is discharged through a bridgewire or foil to vaporize it and thereby accelerate a mass toward an explosive pellet. The resulting impact creates a shock wave in the pellet that brings about an explosion. Another application for such a capacitor is in a strobe light system where an electrical charge stored on the capacitor is discharged through a gas discharge tube, to provide a flash of light. In all of such applications, the capacitor preferably has as low an inductance as possible, so as to maximize the instantaneous current.

Low-inductance capacitors are frequently formed by interleaving and winding together two elongated foil strips with two elongated dielectric strips, to form a cylindrical roll. The foil strips have substantially the same width, but are offset laterally with respect to each other such that their side edges define spiral-shaped projections at opposite ends of the roll. Leads are attached to the two spiral projections by soldering a pair of metal disks or rings against the ends of the roll or by simply axially compressing the disks or rings against the ends. Conductive epoxy terminations are also used.

Although the low-inductance capacitors described above have proven generally satisfactory, they are not believed to be as effective and reliable as is possible. The electrical connections to the two spiral projections, for example, are not believed to be as secure as possible. Additionally, the cylindrical shape of the capacitors is not always preferred. This is especially the case where the capacitor must be attached to a conventional foil strip transmission line, which includes two foil conductors (e.g., copper) secured to the opposite sides of a flat insulator (e.g., Kapton), and which itself has a generally low inductance. In such situations, the capacitor preferably has a flat, rectangular configuration.

It should therefore be appreciated that there is a need for an improved low inductance capacitor of the type formed by interleaving and rolling together two foil strips with two dielectric strips. In particular, there is a need for such a capacitor with an improved means for electrically connecting to the two foil strips, and a need for a capacitor configuration that better lends itself to connection to a conventional foil strip transmission line.

SUMMARY OF THE INVENTION

The present invention is embodied in a low-inductance capacitor, and a method for manufacturing it, of the type having two elongated foil strips interleaved with two elongated dielectric strips and wound into a spiral roll. The two foil strips are of substantially the same width, but are offset laterally with respect to each other such that they form a pair of spiral-shaped projections defining the opposite ends of the roll. In accordance with the invention, the spiral roll is oblong in shape, and two separate clamping means are provided, each for compressively gripping the oblong spiral-shaped projection of a separate one of the two foil strips. These two clamping means make secure electrical contact with the two foil strips, and electrical lead means are connected to the two clamping means. This configuration provides secure electrical coupling to the two foil strips, and is especially adapted for coupling to a conventional foil strip transmission line.

More particularly, the capacitor of the invention is formed by rolling the interleaved foil and dielectric strips around a mandrel, such that a hollow core is formed in the resulting roll. This core, which can be either circular or oblong, facilitates a subsequent flattening of the roll. The mandrel is sized such that a predetermined length for the strips yields a prescribed number of turns and thus a prescribed width and height for the flattened roll.

In one aspect of the invention, each clamping means includes an elongated U-shaped clamp having a pair of legs that compressively engage the opposite sides of the flattened foil projection. This provides a secure electrical connection with all of the layers of the wound foil strip. The projection preferably has a depth of about one-eighth inch, and the channel is sized to accommodate this depth.

In the preferred embodiment, the roll's height, i.e., the distance between its flattened sides, is substantially less than its width and length, such that the roll has a flat, rectangular configuration. The lead means is in the form of a conventional foil strip transmission line, one foil conductor of the strip line being connected to one U-shaped clamp, and the other foil conductor of the transmission line being connected to the other U-shaped clamp.

Other features and advantages of the present invention should become apparent from the following description of the preferred embodiments, taken in conjunction with the accompanying drawings, which illustrate, by way of example, the principles of the invention.

BRIEF DESCRIPTION OF THE DRAWINGS

FIG. 8 is a sectional view similar to that of FIG. 2, but of a second embodiment of the invention, in which the capacitor roll is bent around the end of the foil strip transmission line;

FIG. 9 is a perspective view of a third embodiment of the invention, in which the capacitor roll is oriented across one conductor of the foil strip transmission line; and FIG. 10 is a sectional view similar to that of FIG. 2, but of a fourth embodiment of the invention, which includes a separate capacitor roll mounted on each side of a three-conductor foil strip transmission line.

DESCRIPTION OF THE PREFERRED EMBODIMENT

Referring now to the exemplary drawings, and particularly to FIGS. 1–7, there is shown a first embodiment of a high-voltage, low-inductance capacitor 11 constructed in accordance with the present invention. The capacitor is shown as part of an exploding foil initiator system of a type that further includes a foil strip transmission line 13, i.e., strip line, and a spark gap device 15. The spark gap device is used to discharge an electrical charge stored on the capacitor through a necked-down portion 17 of the strip line, to vaporize the foil and thereby initiate an explosion in an explosive pellet (not shown).

Figure 4:
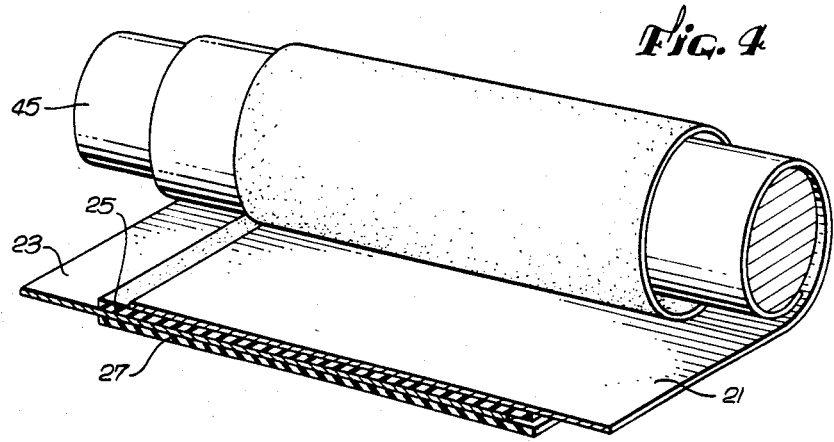
FIG. 4 is an enlarged perspective view of the roll of interleaved foil and dielectric strips that comprise the capacitor, shown at an initial stage of winding around a mandrel.

As shown in FIG. 4, the capacitor 11 includes two elongated foil strips 21 and 23 and two elongated dielectric strips 25 and 27, which are interleaved together and wound to form a spiral capacitor roll 29. One foil strip serves as the first plate of the capacitor, and the other as the second plate of the capacitor. In a conventional fashion, the two foil strips are offset laterally with respect to each other such that each projects outwardly from an opposite side of the roll by approximately one-eighth inch. The roll is flattened in a direction perpendicular to its longitudinal axis, so that each projection takes the form of an oblong spiral (see FIG. 5). One such oblong spiral projection 31 is connected to a conductor 33 on one side of the strip line 13, and the other oblong spiral projection 35 is connected to a conductor 37 on the opposite side of the strip line. Although not always required, a shallow, rectangular housing 39 is shown enclosing and hermetically sealing the capacitor roll and connections to the strip line.

In accordance with the invention, the connection between the two oblong spiral projections 31 and 35 and the respective conductors 33 and 37 of the strip line 13 are made using two separate U-shaped clamps 41 and 43 for compressively gripping the projections. After attachment, each clamp serves as a convenient terminal for connection to the strip line. In particular, each clamp extends over substantially the entire length of the projection, and is sized such that the inner surfaces of its two legs press inwardly against the outermost winding of the projection. This insures that there will be a secure electrical contact with all of the windings of the projection. The electrical current path is therefore very short, and this, coupled with the capacitor roll's proximity to the strip line and the roll's current-carrying performance being similar to the strip line, ensures that the combined capacitor and strip line will have an exceedingly low inductance. Inductances on the order of 1–3 nanohenries can be achieved for capacitors having capacitances of about 0.1 microfarads and working voltage ratings of about 4500 volts dc.

More particularly, the foil strips 21 and 23 used to form the spiral capacitor roll 29 are preferably made of aluminum, and the dielectric strips 25 and 27 are preferably of a film dielectric such as Mylar plastic or polysulfone. The widths, lengths and thicknesses of the strips are selected in a conventional fashion to provide the capacitor 11 with the desired capacitance and voltage rating. The foil strips are cut back for the last several turns of the roll, to provide additional insulation at the roll's outer periphery.

Figure 5:
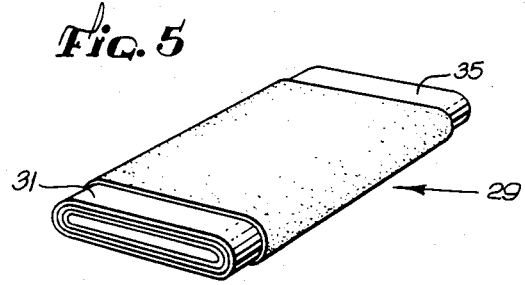
FIG. 5 is a perspective view of the roll of interleaved foil and dielectric strips, after it has been flattened into its final shape.

As shown in FIG. 4, the capacitor roll 29 is formed by wrapping its foil and dielectric strips around a mandrel 45. The mandrel is depicted as being cylindrical, although it could alternatively be oblong or even flat. The dimensions of the mandrel are selected such that a predetermined length for the strips results in a prescribed number of turns and thus a prescribed width and height for the final, flattened roll (FIG. 5).

Figure 6:
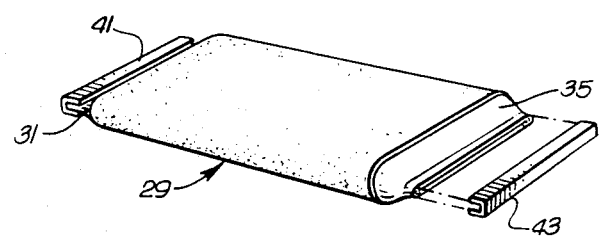
FIG. 6 is a perspective view of the capacitor roll with one U-shaped clamp secured to the oblong foil projection at one end of the roll and with the other U-shaped clamp in position to be secured to the projection at the other end of the roll.
Figure 7:
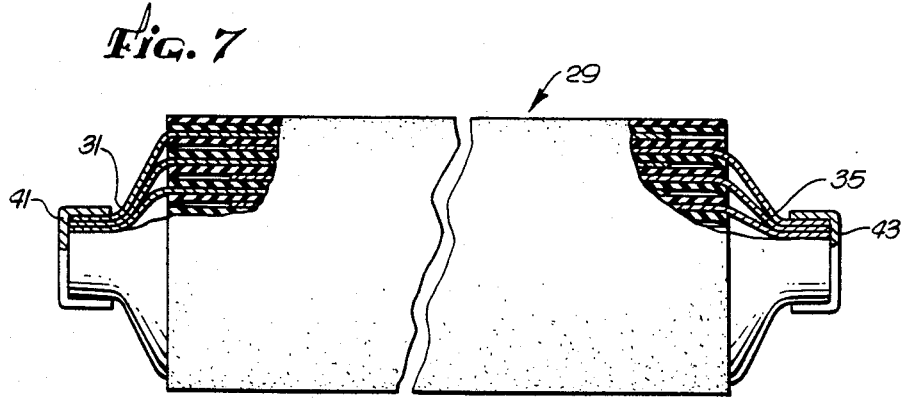
FIG. 7 is an enlarged elevational view of the capacitor roll, with portions of the roll being broken away to reveal the individual layers of the foil strips being clamped by the two U-shaped clamps.

Since the foil strips 21 and 23 represent only a portion of the total thickness of each winding on the roll 29, their respective oblong spiral projections 31 and 35 will have spaces between their successive windings. Each projection can therefore be compressed to a thickness substantially shallower than that of the roll, as shown in FIGS. 5–7.

The two U-shaped clamps 41 and 43 are sized to accommodate the two respective foil strip projections 31 and 35. In particular, the depth of each clamp is comparable to the one-eighth inch depth of each projection, and the distance between the inner surfaces of the clamp's two legs is comparable to the thickness of the flattened projection. The clamps are crimped onto the projections, to make secure electrical contact with them, using, for example, a press or vice. Alternatively, the clamps could be welded onto the projections or both crimpled and welded onto them. The clamps can be conveniently formed of any of a number of conductive and flexible metals, such as copper, aluminum or brass.

Figure 1:
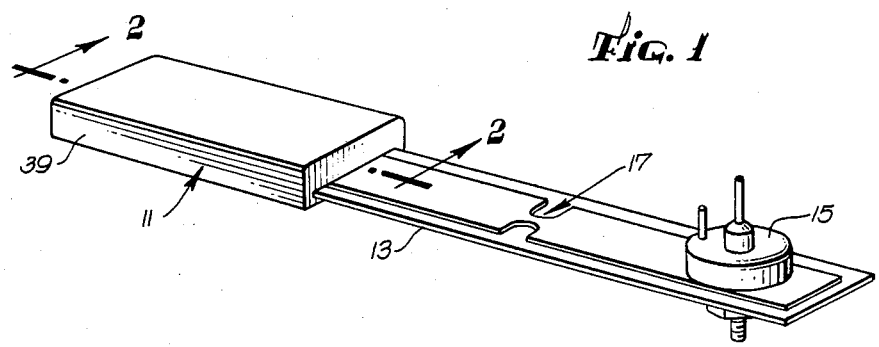
FIG. 1 is a perspective view of a first embodiment of a low-inductance capacitor constructed in accordance with the present invention, the capacitor including a shallow rectangular housing and being adapted for connection to a foil strip transmission line.
Figure 2:
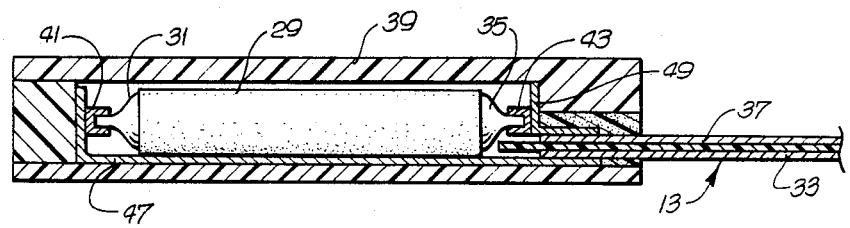
FIG. 2 is a sectional view of the capacitor, taken substantially in the direction of the arrows 2—2 in FIG. 1.
Figure 3:
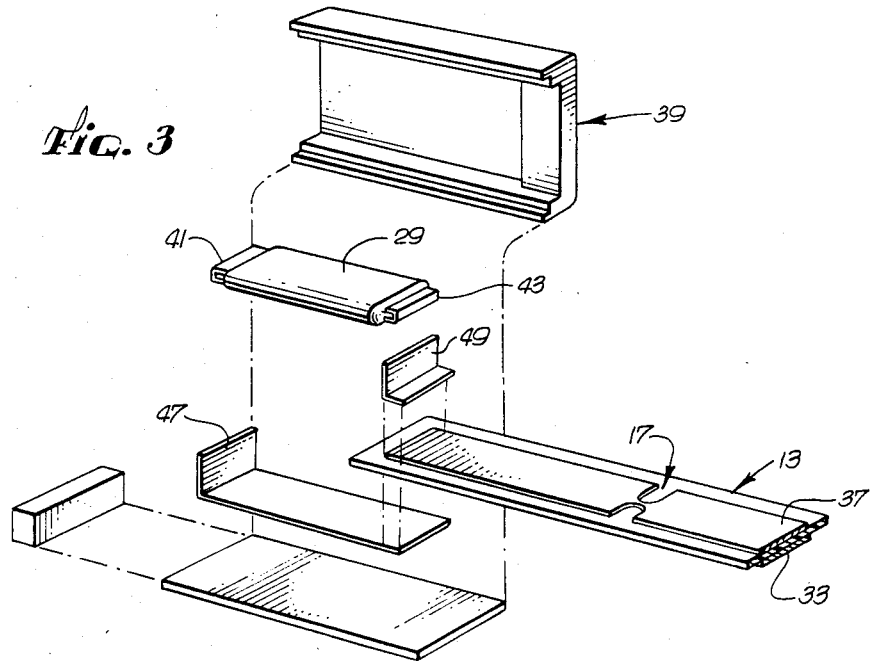
FIG. 3 is an exploded perspective view of the capacitor of FIG. 1.

After the two U-shaped clamps 41 and 43 have been secured to the respective foil strip projections 31 and 35, the clamps are electrically connected to the two conductors 33 and 37 of the strip line 13. As shown in FIGS. 2 and 3, the left side clamp 41 is connected to the lower conductor 33 by a first copper foil strip 47, and the right clamp 43 is connected to the upper conductor 37 by a second copper foil strip 49. The connections can be conveniently made by soldering. Alternatively, the clamps 41 and 43, themselves, can include integral extensions that can be suitably connected to the strip line conductors. The capacitor roll 29 and attached strip line can then placed within the rectangular housing 39, for hermetic sealing.

FIGS. 8, 9 and 10 depict three alternative configurations for the capacitor of the invention, likewise providing extremely low inductances. These three embodiments include capacitor rolls that are substantially identical to the roll 29 of the first embodiment, described above, except that they are connected differently to the strip line. They are adapted to be enclosed in optional rectangular housings (not shown) similar to the housing 39 of the first embodiment, but with modified dimensions. It will be appreciated that there are many other possible configurations based on the same capacitor roll and clamp arrangement.

In the FIG. 8 embodiment, a capacitor roll 51 is bent around the end of a strip line 53, with two U-shaped clamps 55 and 57 connected to the respective upper and lower conductors 59 and 61 of the strip line via soldered foil strips 63 and 65. This configuration provides a more symmetrical arrangement for the roll. As an alternative to this embodiment, the capacitor roll remains flat at the end of the strip line, rather than being bent around it. The combination therefore is generally T-shaped, and the foil strips will necessarily have slightly longer lengths. As was the case with the embodiment of FIGS. 1–7, the foil strips could be formed from extensions of the clamps, themselves.

In the FIG. 9 embodiment, a capacitor roll 67 is oriented across, rather than in alignment with, a strip line 69. Again, one clamp 71 is connected by a first soldered foil strip 73 to the strip line's upper conductor 75, and another clamp 77 is connected by a second soldered foil strip 79 to the strip line's lower conductor 81. It will be appreciated that a second capacitor roll (not shown) could be mounted on either the same side or opposite side of the strip line, either in series with or in parallel with the first roll.

The alternative embodiment shown in FIG. 10 includes a pair of identical capacitor rolls 83 and 85, each mounted on an opposite side of a three-conductor strip line 87. One terminal 89 or 91 of each roll is connected via soldered foil strip 93 or 95 to a separate one of the strip line's two outer conductors 97 or 99, and the opposite terminals 101 and 103 of the two rolls are connected via a pair of soldered foil strips 105 and 107 to the strip line's middle conductor 109.

In still another embodiment of the invention, not shown explicitly in the drawings, the capacitor roll is mounted directly onto one side of the strip line, with their respective longitudinal axes in parallel. One clamp is secured by a foil strip directly to the conductor on the same side of the strip line, and the other clamp is secured to the other conductor by a foil strip wrapped around an end of the strip line.

It should be appreciated from the foregoing description, that the present invention provides an improved high-voltage, low-inductance capacitor, having an interleaved roll of foil and dielectric strips. The roll is flattened, and the foil strips are offset laterally with respect to each other to form oblong spiral projections that are compressively gripped by separate U-shaped clamps, for connection to the foil conductors of a conventional foil strip transmission line. The capacitor roll behaves somewhat like an extension of the transmission line, such that the combination has an exceedingly low inductance, making them suitable for numerous high-current applications.

Although only a few embodiments of the invention have been illustrated and described, it will be apparent that various additional modifications can be made without departing from the invention. Accordingly, the invention is limited only by the following claims.

I claim:

1. A low-inductance capacitor comprising:
    two elongated foil strips of substantially the same width;
    two elongated dielectric strips interleaved with the two foil strips and wound to form an oblong spiral roll having flat opposing sides, the two foil strips being spaced a predetermined distance apart from each other for all of the successive windings of the roll;
    wherein the two foil strips are offset laterally with respect to each other such that they form oblong spiral-shaped projections defining opposite ends of the roll;
    two clamps for independently compressively gripping the two oblong spiral-shaped projections and thereby making electrical contact with them and serving as elongated, flat electrical terminals for the roll;
    a foil strip transmission line including two foil conductor strips secured to the opposite sides of a flat insulator strip; and
    electrical connection means for interconnecting each of the two clamps with a separate foil conductor strip of the transmission line, the electrical connection means extending substantially along the entire lengths of the two clamps.

2. A low-inductance capacitor as defined in claim 1, wherein each clamp is elongated and has a generally U-shaped cross-section, with its two legs compressively engaging the opposite flat sides of one of the oblong, spiral-shaped projections.

3. A low-inductance capacitor as defined in claim 2, wherein each spiral-shaped projection projects about one-eighth inch beyond the edges of the two dielectric strips, each U-shaped clamp being sized to accommodate this dimension.

4. A low-inductance capacitor as defined in claim 1, wherein the electrical connection means includes:
    a first foil strip soldered between one clamp and one conductor strip of the transmission line; and
    a second foil strip soldered between the other clamp and the other conductor strip of the transmission line.

5. A low-inductance capacitor as defined in claim 1, and further including a shallow rectangular housing enclosing the oblong spiral roll, the two clamps and the electrical connection means.

6. A low-inductance capacitor as defined in claim 1, wherein the longitudinal axis of the oblong spiral roll is parallel with the longitudinal axis of the transmission line.

7. A low-inductance capacitor as defined in claim 6, wherein:
    the oblong spiral roll is located adjacent one side of the transmission line; and
    the capacitor further includes a second oblong spiral roll substantially identical to the first roll and located adjacent to the other side of the strip line.

8. A low-inductance capacitor as defined in claim 1, wherein the oblong spiral roll is located adjacent to one side of the strip line, with its longitudinal axis perpendicular to the longitudinal axis of the transmission line.

9. A low-inductance capacitor as defined in claim 1, wherein the oblong spiral roll is symmetrically located at one end of the transmission line.

10. A low-inductance capacitor as defined in claim 9, wherein the oblong spiral roll is bent around the end of the strip line, with one clamp located immediately adjacent to the conductor strip on one side of the transmission line and the other clamp located immediately adjacent to the conductor strip on the other side of the transmission line.

11. A low-inductance capacitor as defined in claim 7, wherein the widths of the two clamps are substantially equal to the widths of the respective foil strips of the transmission line.

12. A method for forming a low-inductance capacitor, comprising steps of:
    interleaving two elongated foil strips with two elongated dielectric strips to produce a four-layer assembly, the two foil strips being of substantially the same width, but laterally offset with respect to each other such that the side edge of one projects to one side of the assembly and the side edge of the other projects to the other side of the assembly;

winding the four-layer assembly around a mandrel to form a hollow spiral roll;

flattening the roll to substantially eliminate its hollow center, the side edge projections of its two foil strips thereby being formed into oblong spirals;

compressively gripping the spiral-shaped projections of the two foil strips using separate elongated U-shaped clamps, each having a pair of legs that compressively engage the flattened sides of a separate spiral-shaped projection; and electrically coupling the two U-shaped clamps to two foil conductor strips on a foil strip transmission line.

13. A method as defined in claim 12, wherein the mandrel used in the step of winding is substantially cylindrical, whereby the hollow roll has a substantially circular, ring-shaped cross-section.

14. A method as defined in claim 12, wherein the step of winding includes a step of selecting dimensions for the mandrel such that a predetermined length of the four-layer assembly yields a prescribed number of turns and thus a prescribed width and height for the flattened roll.

* * * * *